(12) United States Patent
McCann

(10) Patent No.: US 7,164,922 B2
(45) Date of Patent: Jan. 16, 2007

(54) LOCAL PHONE NUMBER LOOKUP AND CACHE

(75) Inventor: Thomas R. McCann, North Bend, WA (US)

(73) Assignee: Intellisist, Inc., Bellevue, WA (US)

( * ) Notice: Subject to any disclaimer, the term of this patent is extended or adjusted under 35 U.S.C. 154(b) by 594 days.

(21) Appl. No.: 10/059,893

(22) Filed: Jan. 29, 2002

(65) Prior Publication Data
US 2003/0069028 A1 Apr. 10, 2003

Related U.S. Application Data

(60) Provisional application No. 60/327,632, filed on Oct. 5, 2001.

(51) Int. Cl.
H04Q 7/20 (2006.01)
(52) U.S. Cl. .................................. 455/456.1; 455/460
(58) Field of Classification Search .. 455/456.1–456.4, 455/404, 521, 412, 414, 436, 456.2, 456.3, 455/460, 461, 404.1, 412.1, 414.2; 340/938, 340/989, 993, 995.18, 426.34, 425.25, 995.24, 340/825, 7.29, 7.48; 701/208, 213; 709/214, 709/203
See application file for complete search history.

(56) References Cited

U.S. PATENT DOCUMENTS 5,963,861 A * 10/1999 Hanson ................... 455/456.1
6,529,143 B1 * 3/2003 Mikkola et al. .......... 340/995.1
6,732,077 B1 * 5/2004 Gilbert et al. ............... 704/270
2002/0086680 A1 * 7/2002 Hunzinger ................... 455/456
2002/0143552 A1 * 10/2002 Odinak ...................... 704/270.1
2003/0032448 A1 * 2/2003 Bulthuis et al. ............. 455/556
2003/0050038 A1 * 3/2003 Haave et al. ................ 455/404
2003/0109244 A1 * 6/2003 Tendler ....................... 455/345
2004/0110515 A1 * 6/2004 Blumberg et al. ........ 455/456.1

* cited by examiner

Primary Examiner—Naghmeh Mehrpour
(74) Attorney, Agent, or Firm—Black Lowe & Graham, PLLC

(57) ABSTRACT

A system and method for wirelessly connecting a computer device to a server. The system includes a computer device and a phone number look-up device. The computer device generates location data, retrieves a server phone number from memory based on the generated location data, and generates a request that includes the generated location data if no server phone number corresponds to the generated location data. The computer device wirelessly sends the generated request to a default phone number. The phone number look-up device is associated with the default phone number. The phone number look-up device receives the request from the computer device, retrieves a server phone number from a local memory based on the received request, and sends the retrieved server phone number to the computer device. The computer device wirelessly connects to a server based on the sent server phone number.

4 Claims, 2 Drawing Sheets

LOCAL PHONE NUMBER LOOKUP AND CACHE

PRIORITY CLAIM

This application claims priority from U.S. Provisional Application Ser. No. 60/327,632, filed Oct. 5, 2001.

FIELD OF THE INVENTION

This invention relates generally to client-server communication and, more specifically, to mobile client-server communication.

BACKGROUND OF THE INVENTION

Vehicle-based telematics units connect to a telematics server via a wireless connection in order to receive information with which to interact with the vehicle operator. Presently, when a telematics unit is activated it places a call to a cellular phone number in a cellular network that then makes a connection between the telematics unit and the telematics server. When the vehicle of the telematics unit is not in its local calling area, roaming or long distance fees are incurred for a unit/server session. The telematics unit requires a phone number that is local relative to the present location of the telematics unit in order to access the telematics server without incurring increased communication fees. In order for the telematics unit to call a phone number that is different than its base or default phone number, the user must take the time to figure out what phone number is a proper phone number given the present vehicle location, and must enter that number while operating the vehicle. This imposes a number of problems, one of which is safety. The whole point of the telematics unit is to provide hands-free operation and interaction with the telematics server. Safety is compromised when the user must manually enter a phone number. Also, the user would have to find the proper phone number, which may be hard to locate under the circumstances or be unavailable to the user.

Therefore, there exists a need to provide easier and more cost effective access to a telematics server.

SUMMARY OF THE INVENTION

The present invention includes a system and method for wirelessly connecting a computer device to a server. The system includes a computer device and a phone number look-up device. The computer device includes a location generator, memory, a processor, and a communication device. The location generator generates data related to the location of the computer device. The memory stores server phone numbers based on location. The processor retrieves a server phone number from the memory based on the generated location data, and generates a request that includes the generated location data if no server phone number corresponds to the generated location data. The communication device wirelessly connects the computer device to a server using the retrieved server phone number, and wirelessly sends the generated request to a default phone number. The phone number look-up device associated with the default phone number includes memory, a communication device, and a processor. The memory of the phone number look-up device stores server phone numbers based on location. The communication device receives the request from the computer device and sends it to the processor. The processor retrieves a server phone number from the memory based on the received request. The communication device sends the retrieved server phone number to the computer device, and the communication device of the computer device wirelessly connects to a server based on the sent server phone number.

In accordance with further aspects of the invention, the computer device is a telematics control unit, a laptop computer, or a personal data assistant.

In accordance with other aspects of the invention, the location generator is an active speech recognition device that records location information as spoken by a user, and generates location data by performing active speech recognition of the recorded location information. Location information can also be received from a GPS receiver.

As will be readily appreciated from the foregoing summary, the invention provides a system and method for providing the most economical wireless connection between a mobile device and a stationary server.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
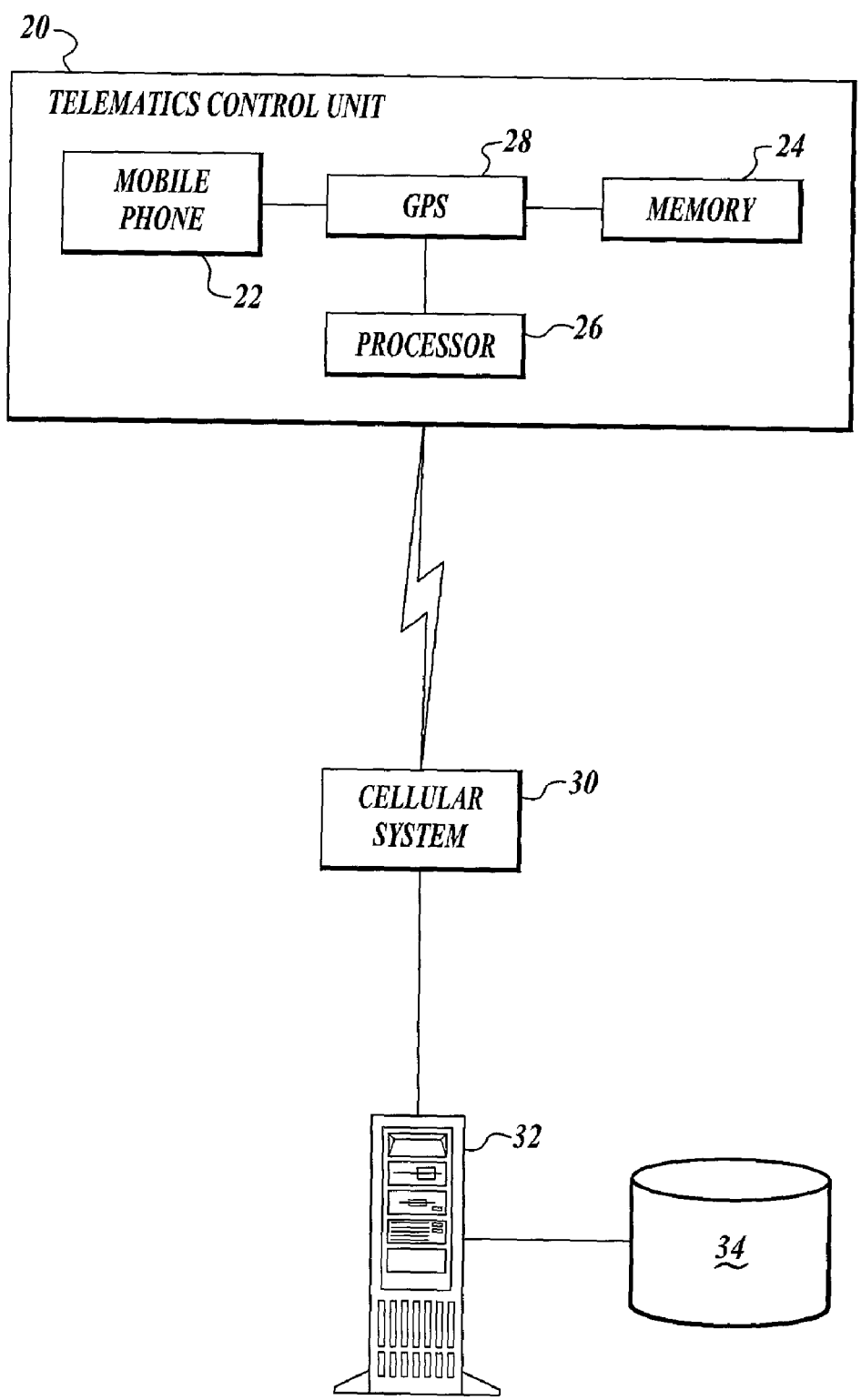
FIG. 1 is a block diagram of an example system formed in accordance with the present invention; and, FIG. 2 is a flow chart illustrating operation of the present invention.

The present invention provides a system and method for automatically looking up and storing a telematics server phone number that is proximate to the telematics control unit. As shown in FIG. 1, a telematics control unit (TCU) 20 is shown in wireless communication with a telematics server 32 over a cellular or mobile system 30. TCU 20 includes a mobile phone 22, local storage or memory 24, a processor 26, and a global positioning system (GPS) 28. A phone number database 34 is coupled to telematics server 32.

When TCU 20 is activated or requires connection to telematics server 32, processor 26 retrieves a telematics server phone number from memory 24 based on GPS information received from GPS 28. The processor 26 retrieves a number that allows TCU 20 to establish a local connection. However, if processor 26 determines that no phone number in memory 24 corresponds to the GPS information, the processor places a call over mobile phone 22 to a default server phone number, thereby connecting TCU 20 to telematics server 32 via cell system 30. Upon connection with telematics server 32, processor 26 generates a request that is sent to the telematics server requesting that the telematics server provide a local phone number based on GPS information that the processor sends along with the request. The telematics server then retrieves a phone number from phone number database 34 based on the request and the GPS information associated with the request that are sent from TCU 20. Telematics server 32 then transmits the retrieved phone number to TCU 20. TCU 20 then cancels the present call that is placed and places a second call to the phone number that was received from telematics server 32. The phone number that is received from telematics server 32 is also stored in local memory 24 by processor 26.

Figure 2:
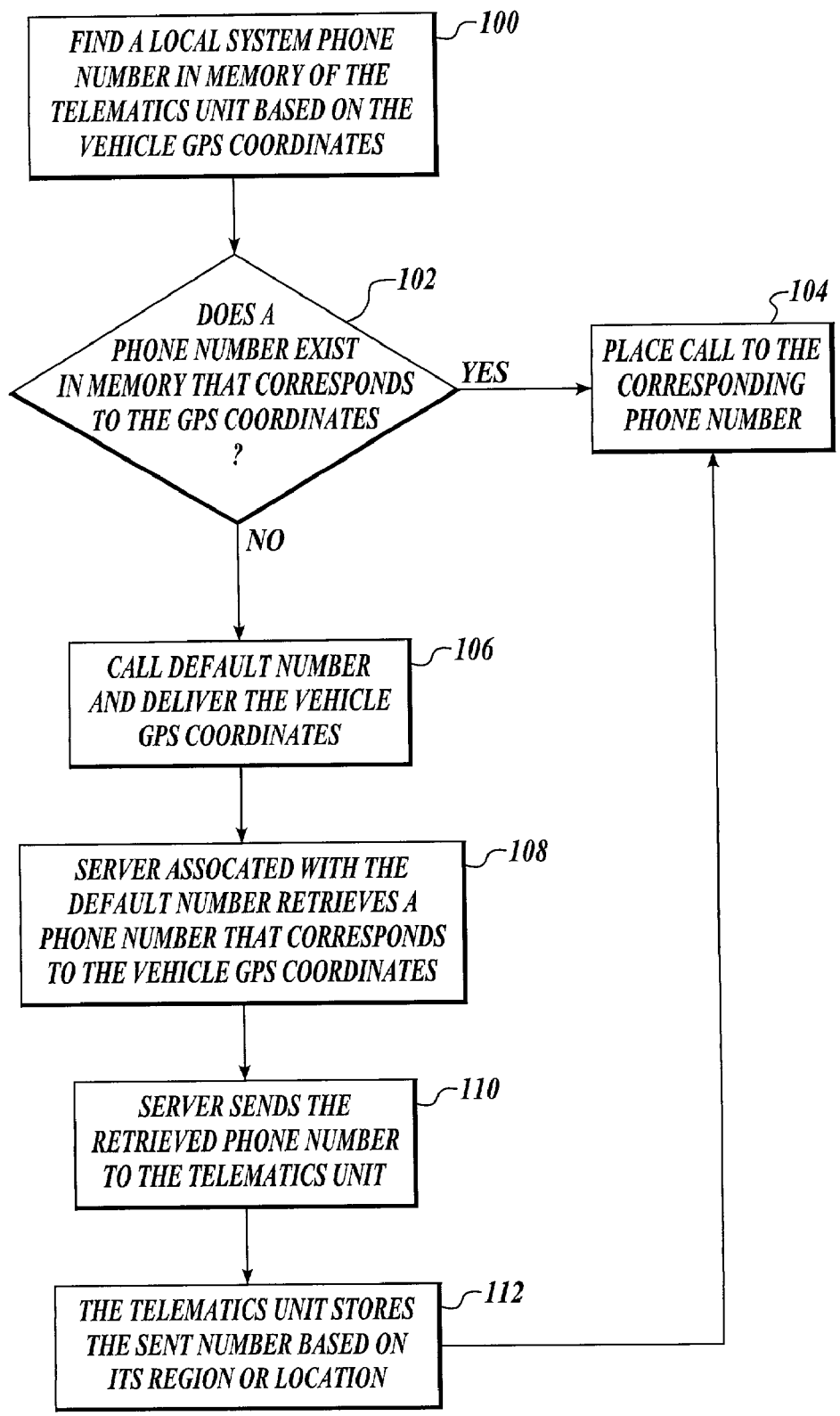

FIG. 2 illustrates a flow diagram performed by the system illustrated in FIG. 1. First, at block 100, processor 26 finds a local phone number in telematics unit memory 24 based on the vehicle's present GPS coordinates as generated by GPS 28. At decision block 102, the process determines if processor 26 found a phone number that corresponds to the GPS coordinates. If processor 26 found a phone number that corresponds to the GPS coordinates, TCU 20 places a call using the corresponding number (see block 104), and TCU/server communication begins. If no phone number was found in memory 24 that corresponds to the GPS coordinates, processor 26 calls a default number and delivers the vehicle GPS coordinates and a request for a local number to a device associated with the default number (see block 106). The device associated with the default number is most likely a telematics server 32 that is not local to the vehicle. Next, at block 108, device or server 22 associated with the default number retrieves a phone number associated with a server that corresponds to the delivered vehicle GPS coordinates. At block 110, server 32 sends the retrieved phone number to telematics unit 20. Then, at block 112, the telematics unit stores the sent number based on a region or location. And, finally, processor 26 places a call to the phone number sent from server 32.

In an alternate embodiment, the process described above is used to find a local Internet Service Provider number for a mobile computer or personal data assistant. In this embodiment, the server either uses caller-identification information or information entered by the user to determine the user's location.

In another embodiment, a user calls an Automatic Speech Recognition (ASR) system and speaks their location (city and state or zip code). The ASR system converts the spoken location information into location data and sends the location data to a telematics server. The telematics server retrieves a local phone number based on the location and returns the local phone number to the ASR. The ASR converts the local number into spoken word that is sent to the user.

In still another embodiment, multiple phone numbers are retrieved simultaneously from the telematics server 32. The multiple phone numbers might be those numbers that correspond to a known route that the user frequently travels, a planned route, or for a given region (i.e., geographic, area code, or prefix). These factors for retrieving multiple phone numbers are determined by interpreting GPS information or performing speech recognition processing of recorded speech information and comparing the determined location to stored information pertaining to the user, such as stored frequent trip information, or stored planned route information.

Some or all of the functions performed by server 32 and database 34 can be distributed across a public or private data network.

While the preferred embodiment of the invention has been illustrated and described, as noted above, many changes can be made without departing from the spirit and scope of the invention. For example, while the preferred embodiment has been described specifically with reference to a system and method for wirelessly connecting a telematics control unit to a server, the invention contemplates application using any computing device, presently known or unknown, including but not limited to mobile computers (such as laptop computers or wearable computers), personal data assistants, and smart telephones. Accordingly, the scope of the invention is not limited by the disclosure of the preferred embodiment.

The embodiments of the invention in which an exclusive property or privilege is claimed are defined as follows:

1. A system for wirelessly connecting a computer device to a server, the system comprising:
    a computer device comprising:
        a location generator for generating data related to the location of the computer device;
        a memory for storing server phone numbers based on location;
        a processor for retrieving a server phone number from the memory based on the generated location data, and for generating a request that includes the generated location data if no server phone number corresponds to the generated location data; and
        a communication device for wirelessly connecting the computer device to a server using the retrieved server phone number, and for wirelessly sending the generated request to a default phone number; and
    a phone number lookup device associated with the default phone number, the phone number look-up device comprises:
        memory for storing server phone numbers based on location;
        a communication device for receiving the request from the computer device; and
        a processor for retrieving a server phone number from the memory based on the received request,
    wherein the communication device sends the retrieved server phone number to the computer device, and the communication device of the computer device wirelessly connects to a server based on the sent server phone number.

2. The system of claim 1, wherein the computer device is a telematics control unit.

3. The system of claim 1, wherein the computer device is at least one of a laptop computer or personal data assistant.

4. The system of claim 1, wherein the location generator is an active speech recognition device for recording location information as spoken by a user, and generating location data by performing active speech recognition of the recorded location information.

* * * * *